US012681289B2

(12) United States Patent
Guo et al.

(10) Patent No.: US 12,681,289 B2
(45) Date of Patent: Jul. 14, 2026

(54) TUNABLE FABRY-PEROT CAVITY DEVICE HAVING MOVABLE MIRROR AND MANUFACTURING METHOD THEREFOR

(71) Applicant: SHENZHEN HYPERNANO OPTICS TECHNOLOGY CO., LTD, Shenzhen (CN)

(72) Inventors: Bin Guo, Shenzhen (CN); Jinbiao Huang, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 572 days.

(21) Appl. No.: 18/042,576

(22) PCT Filed: Aug. 24, 2020

(86) PCT No.: PCT/CN2020/110828
§ 371 (c)(1),
(2) Date: Feb. 22, 2023

(87) PCT Pub. No.: WO2022/040864
PCT Pub. Date: Mar. 3, 2022

(65) Prior Publication Data
US 2023/0324670 A1     Oct. 12, 2023

(51) Int. Cl.
*G02B 26/00*          (2006.01)
*G02B 26/08*          (2006.01)
(52) U.S. Cl.
CPC ....... *G02B 26/001* (2013.01); *G02B 26/0858* (2013.01)
(58) Field of Classification Search
CPC ...... G02B 26/00; G02B 26/001; G02B 26/08; G02B 26/0858; G02B 26/0833;
(Continued)

(56) References Cited

U.S. PATENT DOCUMENTS

2004/0008438 A1* 1/2004 Sato ................... G02B 6/29358
                                                                    359/890
2006/0008200 A1* 1/2006 Nakamura ........... G02B 26/001
                                                                    385/15
(Continued)

FOREIGN PATENT DOCUMENTS

CN          1719302 A       1/2006
CN          1996088 A       7/2007
(Continued)

OTHER PUBLICATIONS

English translation of International Search Report from PCT/CN2020/110828 dated May 20, 2021 (3 pages).

*Primary Examiner* — Jie Lei
(74) *Attorney, Agent, or Firm* — Calfee, Halter & Griswold LLP

(57)                    ABSTRACT

A tunable Fabry-Perot cavity device having movable mirror is disclosed, said movable mirror being provided opposite another mirror, said movable mirror and said another mirror being bonded to each other at the periphery to form a Fabry-Perot cavity between said mirror, said movable mirror comprising a silicon film inlaid with glass, a central region of said silicon film being inlaid with glass to form a light transmitting region, surface of the light-transmitting region facing the Fabry-Perot cavity is provided with mirror material, transition region of the silicon film between bonded periphery region and the central region is inlaid with glass to form an elastic structure. Since the Young's modulus of silicon is much higher than that of glass, the silicon film inlaid with glass can have good mechanical strength and stable elastic coefficient and free from being affected by stress.

20 Claims, 3 Drawing Sheets

(58) Field of Classification Search
  CPC ...... G02B 26/0841; G02B 5/28; G02B 5/284;
               G02B 6/29358; G02B 6/29395; G01J
                  3/26; G01J 3/51; G01J 3/02; G01J
               3/0291; B81B 7/00; B81B 7/0067; B81B
               2201/045; B81C 1/00; B81C 1/00317
  USPC .... 359/578, 579, 587, 589, 585, 247, 223.1,
                        359/302; 356/454, 450, 519
  See application file for complete search history.

(56)                    References Cited

U.S. PATENT DOCUMENTS

2010/0226029 A1 *   9/2010  Funasaka ........... G02B 27/0006
                                                    359/850
2012/0162664 A1 *   6/2012  Bakke ....................... G01J 3/26
                                                    359/872

FOREIGN PATENT DOCUMENTS

CN          105242395  A     1/2016
CN          105549199  A     5/2016
CN          105992964  A    10/2016
JP          2012108371 A     6/2012
JP          2016065937 A     4/2016

* cited by examiner

TUNABLE FABRY-PEROT CAVITY DEVICE HAVING MOVABLE MIRROR AND MANUFACTURING METHOD THEREFOR

CROSS REFERENCE TO RELATED APPLICATIONS

This application is a national application of PCT/CN2020/110828, filed on Aug. 24, 2020, the contents of which are all hereby incorporated by reference.

TECHNICAL FIELD

The invention relates to the field of semiconductor devices, particularly to a Tunable Fabry-Perot cavity device with a movable mirror and manufacturing method therefor.

BACKGROUND TECHNIQUE

Tunable optical filter devices based on Fabry-Perot interference (tunable FPI) can be used to manufacture miniature spectrometers, small and even mini hyperspectral cameras. Fabry-Perot cavity devices in the visible-NIR range usually use optical glass (such as synthetic quartz glass) as substrate, mirror chips are formed through optical and semiconductor processing, and then two mirror chips are assembled with external piezo actuator to form a Fabry-Perot cavity module, the resulting Fabry-Perot cavity module has a large volume and a high drive voltage, which is not suitable for applications in devices with extremely limited space sizes, such as handheld hyperspectral cameras.

On the other hand, micromachining-formed FPI devices are mostly bulk-processed or surface-processed. In surface-processed devices, suspending floating films form movable mirrors, while in bulk-processed devices, substrates with cantilever beam structure form movable mirrors.

For the reason that the substrate of FPI devices in the visible-NIR range usually use optical glass (such as synthetic quartz glass) as substrate, firstly, glass can only be etched with chemical solutions (such as hydrofluoric acid) usually, but the etching speed is very slow (less than 1 micron/min), leading to the difficulties in processing of substrates, and the size of the line that can be processed is limited by the thickness of the substrate (generally 200-700 microns), which makes it impossible to be finely processed; secondly, processing the cantilever beam on the substrate will increase the complexity of device design and processing, thereby increasing the cost; thirdly, the spring and the mirror of a bulk-processed device are provided by one same substrate, which results in the inherent stress and deformation of the mirror affected by the spring; lastly, since the cantilever beam structure occupies a large chip area, it also limits the size of the mirror itself.

SUMMARY OF THE INVENTION

To solve the problems existing in the prior art, the present invention proposes a tunable Fabry-Perot cavity device with a movable mirror and manufacturing method therefor, trying to solve the problems of controllability, stability, and design flexibility of movable mirror in the existing Fabry-Perot cavity device.

The present invention provides a tunable Fabry-Perot cavity device with movable mirror, the movable mirror is provided opposite an another mirror, the movable mirror and the another mirror are bonded to each other at the periphery to form a Fabry-Perot cavity therebetween, the movable mirror comprises a silicon film inlaid with glass, central region of the silicon film is inlaid with glass to form a light-transmitting region, surface of the light-transmitting region facing the Fabry-Perot cavity is provided with mirror material, transition region of the silicon film between bonded periphery region and the central region is inlaid with glass to form an elastic structure. Since the Young's modulus of silicon is much higher than that of glass, the silicon film inlaid with glass can be provided with good mechanical strength and stable elastic coefficient, and free from being affected by stress, thus leading to good reliability and stability of the movable mirror. Also, the inlaid combination of glass and silicon can increase the flexibility of design, by adjusting the design of the inlaid structure, the same device structure can be applied to devices of different sizes, and conductivity of the silicon material can be adjusted by doping and other means, so that the movable mirror may also form an electrode structure and served as the electrode of the external leads of the tunable Fabry-Perot cavity device.

In a preferred embodiment, silicon layer remaining between the transition region and the central region of the silicon film forms an annular support structure. By virtue of the annular support structure formed by the silicon layer, the mechanical flatness of the movable mirror can be enhanced.

In a preferred embodiment, the annular support structure is partially removed to form a venting-channel. By virtue of the venting channel, the rapid circulation of air within the Fabry-Perot cavity and the air outside is facilitated, thereby increasing the speed of transient response when the movable mirror of the Fabry-Perot cavity is moving.

In a preferred embodiment, the movable mirror is made of SOI wafer, wherein the glass is filled into the SOI wafers after silicon layer of the SOI wafer is etched. The variety of forms in which the movable mirror is made can be chosen as appropriate to the actual requirements.

In a preferred embodiment, the another mirror also comprises a silicon film inlaid with glass. The diverse options of the another mirror allow one to choose a suitable mirror according to actual needs, increasing the flexibility of design.

In a preferred embodiment, the another mirror comprises a fixed mirror, the fixed mirror comprising a glass substrate and mirror material provided on the glass substrate. The diverse options of the another mirror allow one to choose a suitable mirror according to actual needs, increasing the flexibility of design.

In a preferred embodiment, another surface of the fixed mirror facing away the movable mirror is also bonded to another movable mirror, the another movable mirror forms another Fabry-Perot cavity with the another surface of the fixed mirror. The diverse options of the another mirror allow one to choose a suitable mirror according to actual needs, increasing the flexibility of design.

In a preferred embodiment, the silicon film inlaid with glass has a thickness between 10-200 microns. The thickness of the film in the form of an inlay is much smaller than that of a conventional glass substrate (300 microns or more), making the device more compact.

In a preferred embodiment, the material of the optical mirror comprises silicon, silicon oxide, or a combination thereof, or silver. The variety of mirror materials allows for the option of a suitable material according to the actual needs.

In a preferred embodiment, way of the bonding comprises eutectic bonding, polymer, or anodic bonding. By virtue of the bonding way, the structure can be tightly bonded to ensure the stability of the tunable optical filter devices.

In a preferred embodiment, the movable mirror is provided with a driving device for controlling the relative displacement of the movable mirror. By virtue of the driving device, the movable mirror may be displaced relative to the another mirror to adjust the spacing of the cavity, thereby achieving the tunable optical filtering function.

In a preferred embodiment, the driving device comprises a capacitive driver or an actuator driver with a piezoelectric film structure. The relative displacement of the movable mirror is controlled by virtue of the capacitive driver or the actuator driver with a piezoelectric film structure, thereby achieving the effect of tunable optical filtering.

In a preferred embodiment, the driving device comprises a first electrode and a second electrode, which electrodes are provided at the periphery of the surface of the movable mirror facing away the mirror thereof and in region of the inlaid silicon layer. By virtue of the capacitive structure formed between the first electrode and the second electrode, the movable mirror can be driven to be displaced to adjust the spacing of the cavity.

In a preferred embodiment, the driving device comprises a piezoelectric film structure provided at the periphery of the surface of the movable mirror facing away the mirror thereof. By virtue of the piezoelectric film structure provided on the movable mirror, the movable mirror can be deformed and thus displaced.

In a preferred embodiment, way for depositing the piezoelectric film on the movable mirror comprises sputtering or sol-gel.

In a preferred embodiment, the piezoelectric film structure comprises lead zirconate titanate film, aluminum nitride film, or zinc oxide film. The material diversity of the piezoelectric film structure allows for the option of a suitable material according to the actual needs.

A method of manufacturing a tunable Fabry-Perot cavity device with a movable mirror, comprises the steps of:

S1: providing a substrate and etching a pattern with a certain depth on the substrate;

S2: melting glass and filling the etched substrate with the glass;

S3: grinding the surface of the substrate filled with the glass to form a substrate inlaid with glass;

S4: depositing an optical mirror material on the surface of the substrate inlaid with glass to form an optical mirror; and S5: removing excess part of the substrate by grinding or etching to form a movable mirror or a Fabry-Perot cavity with a film structure inlaid with glass.

In a preferred embodiment, S5 further comprises the steps of:

S51: bonding two substrates inlaid with glass and having an optical mirror to each other to form a Fabry-Perot cavity between the mirrors; and S52: removing excess part of the substrate by grinding or etching to form a Fabry-Perot cavity with a film structure inlaid with glass.

In a preferred embodiment, the substrate provided in S1 is a silicon substrate or an SOI substrate.

In a preferred embodiment, S1 comprises the steps of:

S11: providing an SOI substrate and etching silicon layer on the SOI substrate to form a pattern with a certain depth; and S12: providing a glass substrate, and bonding the glass substrate with the SOI substrate.

The tunable Fabry-Perot cavity device of the invention has a movable mirror formed by inlay of glass and silicon, and since the Young's modulus of silicon is much higher than that of glass, the silicon film inlaid with glass can be provided with good mechanical strength and stable elastic coefficient, and free from being affected by stress, thus leading to good reliability and stability of the movable mirror. Also, the inlaid combination of glass and silicon can increase the flexibility of the device design, by adjusting the design of the inlaid structure, the same device structure can be applied to devices of different sizes, and the conductivity of silicon material can be adjusted by doping and other means, so that the movable mirror may also form an electrode structure and served as the electrode of the external leads of the tunable Fabry-Perot cavity device.

BRIEF DESCRIPTION OF THE DRAWINGS

The accompanying figures are included to provide a further understanding of the embodiments and the accompanying figures are incorporated into and form part of this specification. The accompanying figures illustrate embodiments and are used in conjunction with the description to explain the principles of the invention. Many of the anticipated advantages of other embodiments and implementations will be readily recognized, as they become better understood by reference to the following detailed description. The elements of the accompanying figures are not necessarily scaled with each other. The same accompanying markings refer to corresponding similar components.

DETAILED DESCRIPTION OF EMBODIMENTS

In the following detailed description, reference is made to the accompanying figures, which form part of the detailed description and are illustrated by illustrative specific embodiments in which the invention may be practiced. In this regard, directional terms such as "top", "bottom", "left", "right", "top", "bottom", etc. Because the components of an embodiment may be positioned in a number of different orientations, orientation terms are used for the purposes of the illustrations and the orientation terms are by no means limiting. It should be understood that other embodiments may be utilized or logical changes may be made without departing from the scope of the invention. The following detailed description should therefore not be adopted in a limiting sense, and the scope of the invention is defined by the appended claims.

Figure 1:
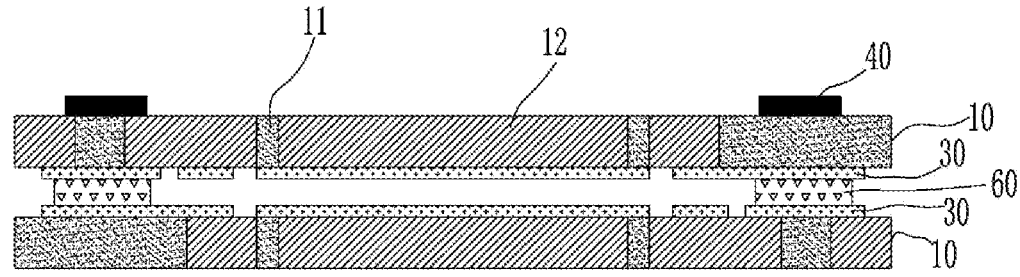
FIG. 1 is a cross-sectional view of a tunable optical filter device according to an embodiment of the invention.

FIG. 1 is a cross-sectional view of a tunable optical filter device of an embodiment of the invention. As shown in FIG. 1, a tunable Fabry-Perot cavity device with a movable mirror, comprising a movable mirror, the movable mirror is a film formed by inlay of a glass 12 and silicon layer 11, specifically can be a silicon film 10 inlaid with glass, central region of the silicon film 10 being inlaid with the glass 12 to form a light-transmitting region, mirror material being deposited on the silicon film 10 to form an optical mirror 30, the movable mirror is provided opposite the another mirror, the movable mirror and the another mirror are bonded to each other at the periphery by a bonding compound 60 to form a Fabry-Perot cavity therebetween, transition region of the silicon film between bonded periphery region and the central region is inlaid with glass to form an elastic structure, in this embodiment, the another mirror is also a silicon film 10 inlaid with glass.

Figure 2:
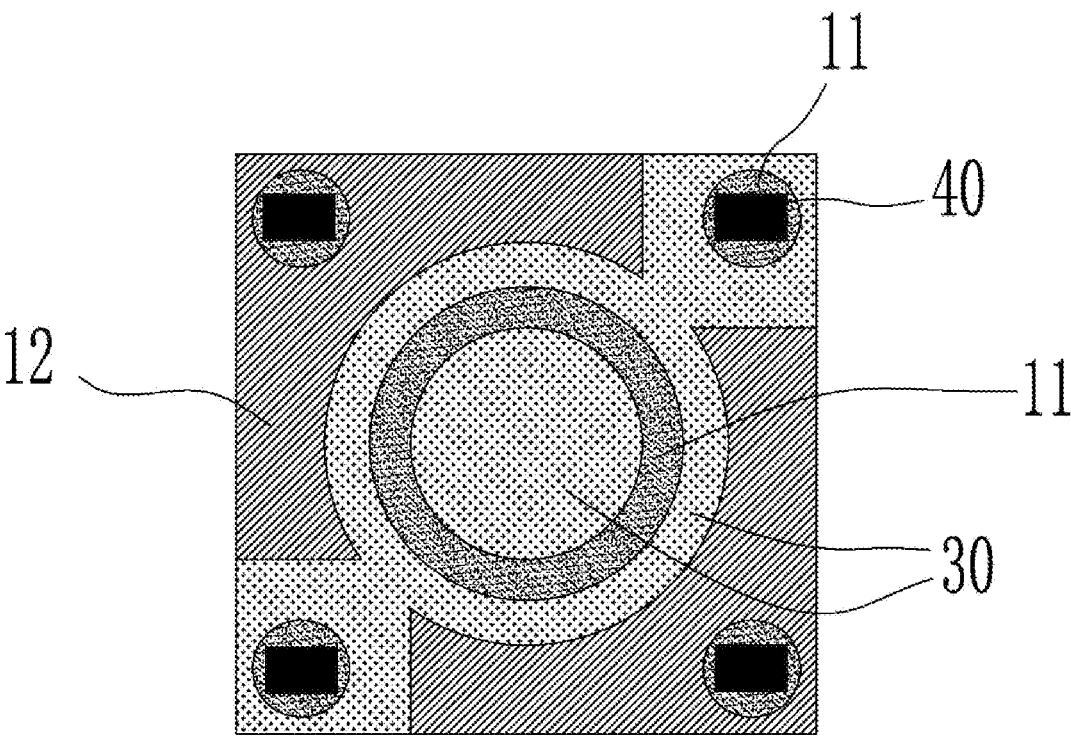
FIG. 2 is a top view of a tunable optical filter device according to an embodiment of the invention.

In a specific embodiment, the movable mirror is a silicon film 10 inlaid with glass, the movable mirror having a thickness between 10-200 microns, which is lower than the thickness of a common glass substrate (greater than 300 microns), allowing for further miniaturization of device. Silicon layer 11 remaining between the transition region and the central region of the silicon film 10 forms an annular support structure, which can be referred to in FIG. 2, the annular support structure enhances the mechanical flatness of the movable mirror. It should be recognized that the shape of the annular support structure is not limited to a circle, but may also be other regular or irregular shapes such as ellipse, rectangle, etc., depending on the shape needed for the specific use scenario. Also, the shape and position of the silicon layer 11 can be designed in different patterns as needed, and the bonding compound 60 can be arranged in different positions as needed.

In a specific embodiment, the silicon film 10 is deposited with mirror material to form the optical mirror 30, and the material of the optical mirror comprises silicon, silicon oxide, or a combination thereof, or silver, when the optical mirror 30 uses a conductive material such as silver and silicon, since conductivity of the silicon material can be adjusted by doping, etc., the electrode 40 can be placed on the surface of the silicon layer 11, the silicon layer with good conductivity and the optical mirror 30 on the other side form a driving conductive pathway through the silicon film 10. Further, electrodes 40 having the same material as the optical mirror 30 can be formed by the same thin film process in micromachining to form a driving device to control the relative displacement of the movable mirror, such as a capacitive driver.

In a specific embodiment, the movable mirror can be bonded to the another mirror, specifically by means of eutectic bonding, polymer, or anodic bonding. Eutectic bonding is to use metal as a transition layer thereby achieving silicon-silicon bonding, of which requirement for surface is not high, with low bonding temperature and high bonding strength; anodic bonding has the advantages of low bonding temperature, good compatibility with other processes, high bonding strength, high stability, and can be used for bonding between silicon/silicon substrates, non-silicon materials and silicon materials, and between glass, metals, semiconductors, and ceramics. Suitable bonding way can be selected according to the actual bonding surface process and materials to achieve the bonding between two glass films.

In a specific embodiment, the inlaid movable mirror can be made by the following steps: S1: providing a substrate and etching a pattern with a certain depth on the substrate; S2: melting glass and filling the etched substrate with the glass; S3: grinding the surface of the substrate filled with the glass to form a substrate inlaid with glass; S4: depositing an optical mirror material on the surface of the substrate inlaid with glass to form an optical mirror; S5: removing excess part of the substrate by grinding or etching to form a movable mirror or a Fabry-Perot cavity with a film structure inlaid with glass. Since the Young's modulus of silicon is much higher than that of glass, the silicon layer can be made into an entire silicon film and maintain its flatness, meanwhile, the silicon layer 11 can also serve to block or reflect light since silicon is opaque in the visible-near infrared range.

In a specific embodiment, another steps of S5 can be applied, specifically, S51: bonding two substrates inlaid with glass and having an optical mirror to each other to form a Fabry-Perot cavity between the mirrors; and S52: removing excess part of the substrate by grinding or etching to form a Fabry-Perot cavity with a film structure inlaid with glass.

Figure 3:
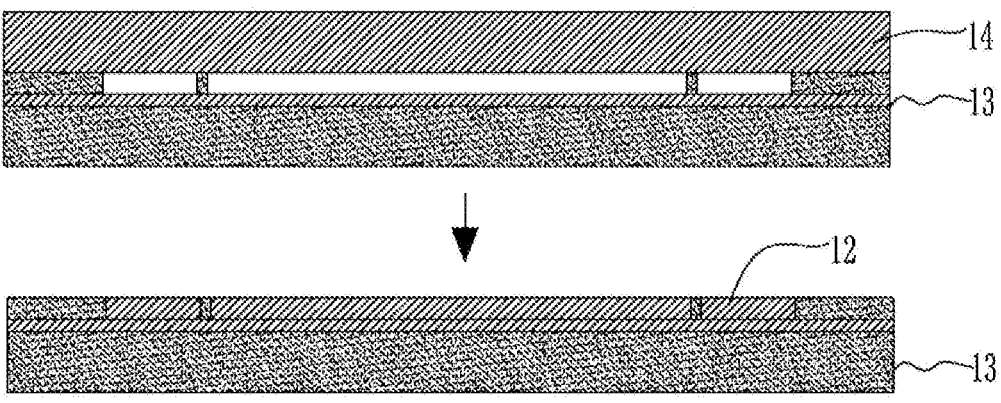
FIG. 3 is an illustration of a way of forming a movable mirror according to an embodiment of the invention.

In a specific embodiment, the movable mirror is made of SOI wafers, as shown in FIG. 3, and the steps for making it differ from the steps of the above embodiments mainly in S1, specifically: S11: providing the SOI substrate 13 and etching silicon layer on the SOI substrate to form a pattern with a certain depth; S12: providing the glass substrate 14 and bonding the glass substrate with the SOI substrate. S2: melting the glass and filling the etched silicon substrate with the glass; S3: grinding the surface of the substrate filled with the glass to form a substrate inlaid with glass; S4: depositing an optical mirror material on the surface of the substrate inlaid with glass to form an optical mirror; S5: removing the excess part of the substrate by grinding or etching to form a movable mirror or a Fabry-Perot cavity with a film structure inlaid with glass.

In a specific embodiment, the movable mirror is provided with a driving device for controlling the relative displacement of the movable mirror, which is specifically, a first electrode 40 and second electrode 40 provided at the periphery of the surface of the movable mirror facing away the mirror thereof and in the region of the inlaid silicon layer 11. By virtue of the capacitive structure formed between the first electrode and the second electrode, the movable mirror can be driven to be displaced to adjust the spacing of the cavity.

Figure 4:
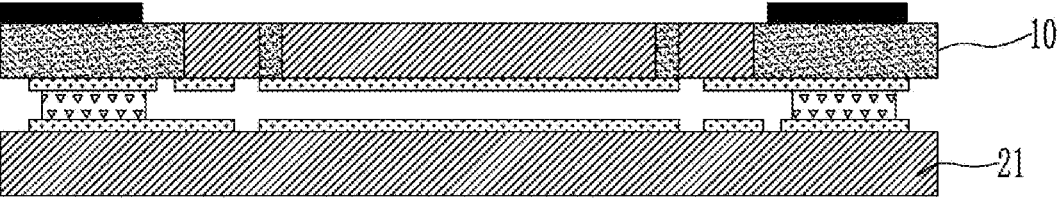
FIG. 4 is a cross-sectional view of a tunable optical filter device according to the second embodiment of the invention.

FIG. 4 is a cross-sectional view of a tunable optical filter device according to the second embodiment of the invention. As shown in FIG. 4, the main difference from the above embodiments is that the another mirror is a fixed mirror 21, and the fixed mirror comprising a glass substrate and mirror material provided on the glass substrate. The diverse option of the another mirror allows the option of a suitable mirror according to the actual needs and increases the flexibility of the design.

Figure 5:
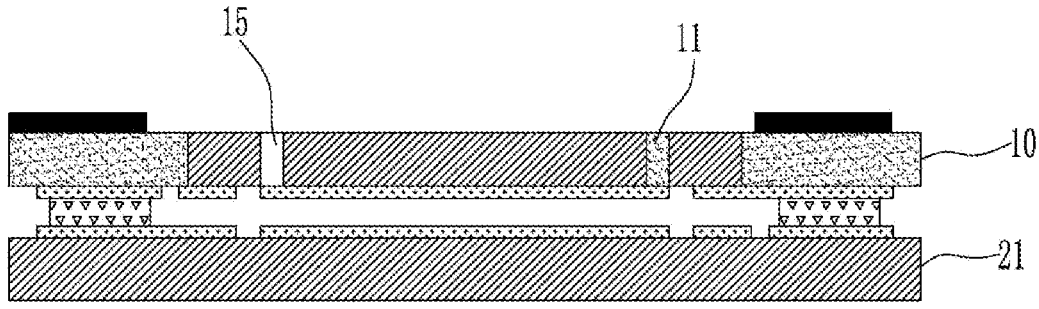
FIG. 5 is a cross-sectional view of a tunable optical filter device according to the third embodiment of the invention.

FIG. 5 is a cross-sectional view of a tunable optical filter device according to the third embodiment of the invention. As shown in FIG. 5, on the basis of the above embodiments, the annular support structure in the silicon layer 11 is partially removed to form a venting channel 15, the removal of silicon can be achieved by dry or wet etching. By virtue of the venting channel, the rapid circulation of air within the Fabry-Perot cavity and the air outside is facilitated, thereby increasing the speed of transient response when the movable mirror of the Fabry-Perot cavity is moving.

Figure 6:
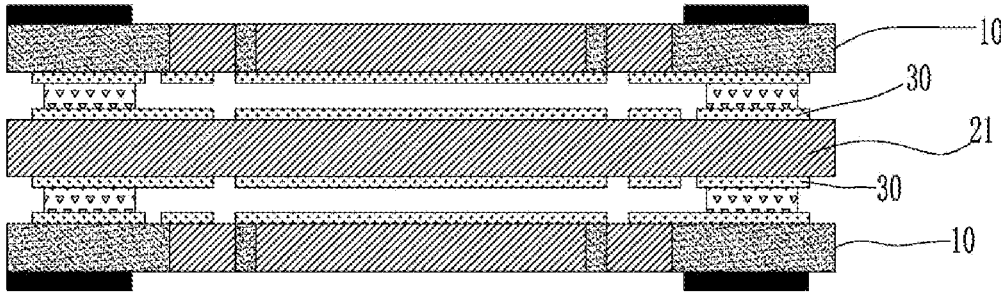
FIG. 6 is a cross-sectional view of a tunable optical filter device according to the fourth embodiment of the invention.

FIG. 6 is a cross-sectional view of a tunable optical filter device according to the fourth embodiment of the invention. As shown in FIG. 6, a tunable Fabry-Perot cavity device with a movable mirror comprises two movable mirrors having a silicon film 10 inlaid with glass and a fixed mirror 21, the fixed mirror 21 having a glass substrate and optical mirror 30 deposited on the top and bottom, the two movable mirrors are bonded to the fixed mirror 21 on the top and bottom respectively to form two Fabry-Perot cavities in both sides, the mirror materials of the two Fabry-Perot cavities can be the same or different. By adjusting the light transmission characteristics of the two Fabry-Perot cavities, a light filtering function that cannot be achieved by a single Fabry-Perot cavity can be achieved.

Figure 7:
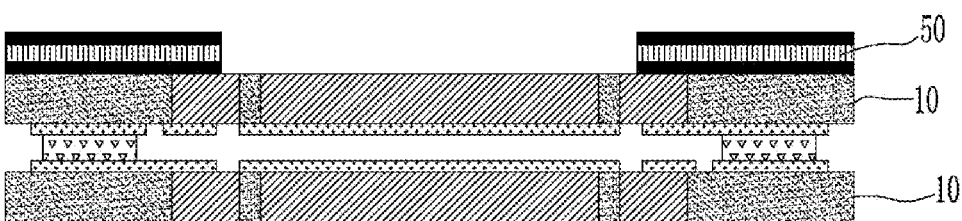
FIG. 7 is a cross-sectional view of a tunable optical filter device according to the fifth embodiment of the invention.

FIG. 7 is a cross-sectional view of a tunable optical filter device of the fifth embodiment of the inventio. As shown in FIG. 7, an actuator driver with a piezoelectric film structure is used to drive, specifically, the driving device comprises a piezoelectric film structure 50 provided at the periphery of the surface of the movable mirror facing away the mirror thereof. The means of depositing the piezoelectric film on the movable mirror comprise sputtering or sol-gel, and the piezoelectric film structure comprises lead zirconate titanate film, aluminum nitride film, or zinc oxide film, which can be selected depending on the practical application.

In the present invention, the movable mirror is formed by inlay of the glass and silicon, since the Young's modulus of silicon is much higher than that of glass, the movable mirror inlaid with glass and silicon can be provided with good mechanical strength and stable elastic coefficient and free from being affected by stress, thus leading to good reliability and stability of the movable mirror. Also, the inlaid combination of glass and silicon can increase the flexibility of design, by adjusting the design of the inlaid structure, the same device structure can be applied to devices of different sizes, and the conductivity of silicon material can be adjusted by doping and other means, so that the movable mirror may also form an electrode structure and served as the electrode of the external leads of the tunable Fabry-Perot cavity device.

It is apparent that various modifications and changes to embodiments of the invention can be made by those skilled in the art without departing from the spirit and scope of the invention. In that manner, the invention is also intended to cover the modifications and alterations if they are within the scope of the claims of the invention and their equivalent forms. The word "comprising" does not exclude the presence of other elements or steps not listed in the claims. The simple fact that certain measures are recorded in mutually distinct dependent claims does not indicate that the combination of these measures cannot be used profitably. Any appended markings in the claims should not be considered to limit the scope.

The invention claimed is:

1. A tunable Fabry-Perot cavity device having a movable mirror, wherein a movable mirror is provided opposite an another mirror, said movable mirror and said another mirror are bonded to each other at periphery to form a Fabry-Perot cavity therebetween, said movable mirror comprises a silicon film inlaid with glass, said glass is filled into said silicon film after said silicon film is etched, a central region of said silicon film is inlaid with glass to form a light-transmitting region, and a surface of the light-transmitting region facing the cavity is provided with a mirror material, a transition region of the silicon film between bonded periphery region and the central region is inlaid with glass which extends throughout said silicon film in a dimension of film thickness to form an elastic structure.

2. The tunable Fabry-Perot cavity device having a movable mirror according to claim 1, wherein a silicon layer remaining between said transition region and said central region of the silicon film forms an annular support structure.

3. The tunable Fabry-Perot cavity device having a movable mirror according to claim 2, wherein said annular support structure is partially removed to form a venting channel.

4. The tunable Fabry-Perot cavity device having a movable mirror according to claim 1, wherein said movable mirror is made of Silicon On Insulator (SOI) wafer, wherein said glass is filled into said SOI wafer after a silicon layer of said SOI wafer is etched.

5. The tunable Fabry-Perot cavity device having a movable mirror according to claim 1, wherein said another mirror also comprises a silicon film inlaid with glass.

6. The tunable Fabry-Perot cavity device having a movable mirror according to claim 1, wherein said another mirror comprises a fixed mirror, which fixed mirror comprises a glass substrate and said mirror material provided on the glass substrate.

7. The tunable Fabry-Perot cavity device having a movable mirror according to claim 6, wherein another surface of said fixed mirror facing away said movable mirror is also bonded to another movable mirror, said another movable mirror forms another Fabry-Perot cavity with said another surface of said fixed mirror.

8. The tunable Fabry-Perot cavity device having a movable mirror according to claim 1, wherein said silicon film inlaid with glass has a thickness between 10-200 microns.

9. The tunable Fabry-Perot cavity device having a movable mirror according to claim 1, wherein material of optical mirror comprises silicon, silicon oxide, or a combination thereof, or silver.

10. The tunable Fabry-Perot cavity device having a movable mirror according to claim 1, wherein way of said bonding comprise eutectic bonding, polymer, or anodic bonding.

11. The tunable Fabry-Perot cavity device having a movable mirror according to claim 1, wherein said movable mirror is provided with a driving device for controlling relative displacement of said movable mirror.

12. The tunable Fabry-Perot cavity device having a movable mirror according to claim 11, wherein said driving device comprises a capacitive driver or an actuator driver with a piezoelectric film structure.

13. The tunable Fabry-Perot cavity device having a movable mirror according to claim 12, wherein said piezoelectric film structure comprises lead zirconate titanate film, aluminum nitride film, or zinc oxide film.

14. The tunable Fabry-Perot cavity device having a movable mirror according to claim 11, wherein said driving device comprises a first electrode and a second electrode, which electrodes are provided at the periphery of the surface of said movable mirror facing away the mirror thereof and in region of the inlaid silicon layer.

15. The tunable Fabry-Perot cavity device having a movable mirror according to claim 11, wherein said driving device comprises a piezoelectric film structure provided at the periphery of the surface of said movable mirror facing away the mirror thereof.

16. The tunable Fabry-Perot cavity device having a movable mirror according to claim 15, wherein the way for depositing said piezoelectric film on said movable mirror comprises sputtering or sol-gel.

17. A method of manufacturing a tunable Fabry-Perot cavity device having a movable mirror, wherein comprises the steps of:

S1: providing a substrate and etching a pattern with a certain depth on the substrate;

S2: melting glass and filling the etched substrate with the glass;

S3: grinding a surface of the substrate filled with the glass to form a substrate inlaid with glass;

S4: depositing an optical mirror material on the surface of the substrate inlaid with glass to form an optical mirror; and S5: removing excess part of the substrate by grinding or etching to form a movable mirror, so as to form a Fabry-Perot cavity with a film structure inlaid with glass, wherein said film structure inlaid with glass comprises a silicon film inlaid with glass, said glass is filled into said silicon film after said silicon film is etched, a central region of said silicon film is inlaid with glass to form a light-transmitting region, and a transition region of the silicon film between bonded periphery region and the central region is inlaid with glass to form an elastic structure.

18. The method of manufacturing a tunable Fabry-Perot cavity device having movable mirror according to claim 17, wherein S5 further comprises the steps of:

S51: bonding two of the substrates inlaid with glass and having an optical mirror to each other to form a Fabry-Perot cavity between the mirrors; and S52: removing excess part of the substrate by grinding or etching to form a Fabry-Perot cavity with a film structure inlaid with glass.

19. The method of manufacturing a tunable Fabry-Perot cavity device having movable mirror of claim 17, wherein the substrate provided in said S1 is a silicon substrate or a Silicon On Insulator (SOI) substrate.

20. The method of manufacturing a tunable Fabry-Perot cavity device having movable mirror according to claim 17, wherein said S1 comprises the steps of:

S11: providing an SOI substrate and etching silicon layer on the SOI substrate to form a pattern with a certain depth; and S12: providing a glass substrate, bonding the glass substrate with the SOI substrate.

* * * * *